US009650485B2

(12) United States Patent
El-Hibri et al.

(10) Patent No.: US 9,650,485 B2
(45) Date of Patent: May 16, 2017

(54) HIGH TEMPERATURE SULFONE (HTS) FOAM MATERIALS

(71) Applicant: SOLVAY SPECIALTY POLYMERS USA, LLC., Alpharetta, GA (US)

(72) Inventors: Mohammad Jamal El-Hibri, Atlanta, GA (US); Nirupama Kenkare, Alpharetta, GA (US); Kermit S. Kwan, Cumming, GA (US); William Walter Looney, Sugar Hill, GA (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 0 days.

(21) Appl. No.: 14/434,451

(22) PCT Filed: Oct. 10, 2013

(86) PCT No.: PCT/EP2013/071176
§ 371 (c)(1),
(2) Date: Apr. 9, 2015

(87) PCT Pub. No.: WO2014/057042
PCT Pub. Date: Apr. 17, 2014

(65) Prior Publication Data
US 2015/0267023 A1 Sep. 24, 2015

Related U.S. Application Data

(60) Provisional application No. 61/713,342, filed on Oct. 12, 2012.

(30) Foreign Application Priority Data

Nov. 23, 2012 (EP) ..................... 12194087

(51) Int. Cl.
| B32B 5/18 | (2006.01) |
|---|---|
| C08J 9/04 | (2006.01) |
| C08G 75/23 | (2006.01) |
| C08L 81/06 | (2006.01) |
| C08J 9/00 | (2006.01) |
| C08J 9/14 | (2006.01) |
| B32B 27/06 | (2006.01) |

(52) U.S. Cl.
CPC ........ *C08J 9/04* (2013.01); *B32B 5/18* (2013.01); *B32B 27/065* (2013.01); *C08G 75/23* (2013.01); *C08J 9/0066* (2013.01); *C08J 9/142* (2013.01); *C08L 81/06* (2013.01); *B32B 2250/03* (2013.01); *B32B 2250/24* (2013.01); *B32B 2266/0214* (2013.01); *B32B 2305/022* (2013.01); *B32B 2307/102* (2013.01); *B32B 2307/304* (2013.01); *B32B 2307/306* (2013.01); *B32B 2307/3065* (2013.01); *C08J 2201/03* (2013.01); *C08J 2381/06* (2013.01); *C08J 2481/06* (2013.01); *Y10T 428/249953* (2015.04)

(58) Field of Classification Search
None
See application file for complete search history.

(56) References Cited

U.S. PATENT DOCUMENTS

| 3,647,751 | A | | 3/1972 | Darsow | |
|---|---|---|---|---|---|
| 4,000,149 | A | | 12/1976 | Isaac et al. | |
| 5,017,622 | A | * | 5/1991 | Bland | C08J 9/0061 521/134 |
| 5,032,336 | A | * | 7/1991 | Asai | C08J 3/226 264/141 |
| 5,091,126 | A | * | 2/1992 | Weber | C08J 9/16 264/53 |
| 6,228,970 | B1 | * | 5/2001 | Savariar | C08G 75/23 525/534 |
| 7,273,919 | B1 | * | 9/2007 | Steiger | C08G 75/23 528/171 |
| 2004/0167241 | A1 | | 8/2004 | Scherzer et al. | |
| 2004/0212119 | A1 | | 10/2004 | Dietzen et al. | |
| 2004/0242807 | A1 | * | 12/2004 | Weber | C08L 81/06 525/537 |
| 2005/0228149 | A1 | | 10/2005 | Trivedi et al. | |
| 2006/0069236 | A1 | * | 3/2006 | Brunelle | C08L 81/06 528/373 |
| 2007/0117962 | A1 | * | 5/2007 | Steiger | C08G 65/4056 528/373 |
| 2008/0293840 | A1 | * | 11/2008 | Maljkovic | C08L 65/02 521/134 |
| 2009/0004425 | A1 | * | 1/2009 | Lehman | B32B 3/18 428/53 |
| 2009/0018265 | A1 | * | 1/2009 | Kailasam | C08L 79/08 524/609 |
| 2010/0080941 | A1 | * | 4/2010 | McCarville | B29C 70/30 428/34.1 |
| 2010/0324171 | A1 | * | 12/2010 | Maljkovic | C08G 65/4012 523/219 |
| 2011/0237693 | A1 | * | 9/2011 | Weber | C08J 5/18 521/91 |
| 2011/0237694 | A1 | * | 9/2011 | Weber | C08J 5/18 521/134 |
| 2011/0294912 | A1 | * | 12/2011 | Weber | C08L 81/06 521/134 |
| 2014/0343184 | A1 | * | 11/2014 | Axelrad | C08J 9/00 521/180 |

FOREIGN PATENT DOCUMENTS

| EP | 411437 A2 | 2/1991 |
|---|---|---|
| GB | 1569763 A | 6/1980 |
| WO | 2005095491 A1 | 10/2005 |
| WO | 2007039538 A1 | 4/2007 |
| WO | 2009085688 A1 | 7/2009 |
| WO | 2011117410 A1 | 9/2011 |
| WO | 2013053851 A1 | 4/2013 |

* cited by examiner

*Primary Examiner* — Robert S Loewe
(74) *Attorney, Agent, or Firm* — Jarrod N. Raphael; Dwight M. Benner, II

(57) ABSTRACT

A foam material made from a composition [composition (C)] comprising at least one high temperature poly(aryl ether sulfone) (PAES$_{HT}$) polymer characterized in that the PAES polymer comprises from 1 to 99% by weight amount of at least one recurring unit ($R_{PAES}$) [($R_{PAES}$-1)]) based on the total amount of recurring units, and from 1 to 99% by weight amount of at least one recurring unit ($R_{PAES}$) [($R_{PAES}$-2)], based on the total amount of recurring units, and wherein said ($R_{PAES}$-2) recurring unit is different from the ($R_{PAES}$-1) recurring unit.

14 Claims, No Drawings

HIGH TEMPERATURE SULFONE (HTS) FOAM MATERIALS

This application claims priority to U.S. provisional application No. 61/713,342 filed on 12 Oct. 2012 and to European application No. 12194087.8 filed on 23 Nov. 2012, the whole content of each of these applications being incorporated herein by reference for all purposes.

FIELD OF INVENTION

The present invention relates to polymeric foams, in particular, to high temperature sulfone foam materials. The invention further relates to methods of manufacturing high temperature sulfone foams and articles made therefrom.

BACKGROUND OF THE INVENTION

Polymeric foams made from high Tg thermoplastic polymers such as notably polyether sulfones (PES), polyphenylsulfones (PPSU) and polyetherimides (PEI), are typically employed in lightweight applications across multiple market segments such as transport, mobile electronics, building materials, household goods, food service trays and medical, and the like. The growing need to use high Tg thermoplastic polymeric foams especially in light structures, such as for example in structural sandwich panels implies critical properties such as notably thermal resistance, flame resistance, environmental resistance, mechanical strength, low-temperature impact resistance, excellent lightweight, thermal-insulating characteristics, soundproofing characteristics, vibration-proofing characteristics, chemical resistance, and recycling properties.

US 2004/0167241 A1 describes open-cell foams which are composed from high-temperature-resistant thermoplastics selected from the group consisting of polyetherimides (PEI), polyether sulfones (PES), polysulfones, polyether ketones, polyether ether ketones, polyether ketone ketones, polyethersulfonamides, and mixtures of these. The working examples were performed with polyether sulfones (PES) as especially preferred high-temperature-resistant thermoplastic.

US 2004/0212119 A1 discloses a process for producing foam webs by foam extrusion of a mixture of a polysulfone or polyether sulfone and a volatile blowing agent, where the blowing agent is water or a mixture of water with an ancillary blowing agent such as notably an inert gas or organic liquid, e.g. an alcohol or a ketone.

WO 2009/085688 discloses a foam composed of the high heat thermoplastic resin polyetherimides (PEI). Said foams were made by a foam extrusion process.

However, said foams composed of high Tg thermoplastic polymers such as polyetherimides (PEI), polyether sulfones (PES) and polyphenylsulfones (PPSU) still show some drawbacks in the manufacturing of foamed articles which requires very high processing temperatures. For example, in the hot thermosetting resin impregnation process used to produce structural sandwich panels, as mentioned above, temperatures as high as 180° C. are required. Said high temperatures are approaching the heat deflection temperatures of the high Tg thermoplastic polymers like PEI, PES and PPSU resulting in a more problematic retention of foam structural integrity during this high temperature manufacturing step.

Thus, there is still a high need for foam materials comprising high-temperature thermoplastic compositions which can overcome all these drawbacks, as mentioned above, and whereby said foam material are characterized by having improved thermal performance capabilities, in particular more robust resistance to very high temperatures used in the manufacturing of structural foamed articles and having improved chemical resistance such as for example resisting hot liquids that are typically used in the transport industry, like for example jet fuels and hydraulic fluids, in particular Skydrol, while retaining all excellent foam properties such as a well defined and fairly homogeneous cell structure and excellent balance of mechanical properties such as high stiffness and strength properties at a low foam density, higher impact resistance to resist breakage in use, high flame and heat resistance, and whereby the high-temperature thermoplastic foam articles made therefrom have excellent heat resistance, flame resistance, and environmental resistance, mechanical strength, and low-temperature impact resistance, and possesses excellent lightweight, thermal-insulating characteristics, soundproofing characteristics, vibration-proofing characteristics, chemical resistance, and recycling properties.

SUMMARY OF INVENTION

The Applicant has now found surprisingly that certain high-temperature thermoplastic foam materials based on high-temperature thermoplastic polymeric materials and comprising optionally specific ingredients are particularly effective in fulfilling above mentioned requirements. Said foam materials have unexpectedly a well defined and homogeneous cell structure as evidenced by closed and smaller foam cells, higher foam void contents, and/or greater uniformity of cell size. Moreover, said foam materials are more robust resistance to the temperature conditions required for the manufacturing of the high-temperature thermoplastic foam articles. Said foam articles fulfil all requirements as mentioned above.

The invention thus pertains to a foam material made from a composition [composition (C)] comprising at least one high temperature poly(aryl ether sulfone) ($PAES_{HT}$) polymer characterized in that the ($PAES_{HT}$) polymer comprises:

from 1 to 99% by weight amount of at least one recurring unit ($R_{PAES}$) [($R_{PAES}$-1)], based on the total amount of recurring units, and from 1 to 99% by weight amount of at least one recurring unit ($R_{PAES}$) [($R_{PAES}$-2)], based on the total amount of recurring units, and wherein said ($R_{PAES}$-2) recurring unit is different from the ($R_{PA}$-1) recurring unit, and the recurring unit ($R_{PAES}$) is a recurring unit complying with formula (A):

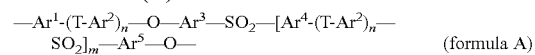

(formula A)

wherein:
Ar$^1$, Ar$^2$ and Ar$^4$ equal to or different from each other and at each occurrence, are independently an aromatic mono- or polynuclear group;
Ar$^3$ and Ar$^5$ equal to or different from each other and at each occurrence, are independently aromatic moieties selected from the group consisting of those complying with following formulae:

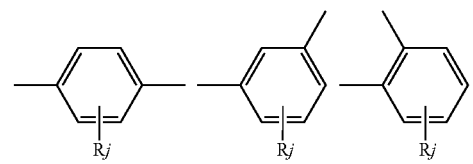

wherein
each R, equal to or different form each other, is selected from the group consisting of:
hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and each j, equal to or different from each other, are independently 0, 1, 2, 3 or 4,
each of T, equal to or different from each other, is a bond or a divalent group optionally comprising one or more than one heteroatom;
n is 0, 1, 2, 3 or 4; and
m is 1, 2, 3 or 4

Another aspect of the present invention is directed to a process for the manufacturing of the foam material.

nary ammonium and j, k and l equal or different from each other, are independently 0, 1, 2, 3 or 4.

In these preferred recurring units ($R_{PAES}$), each of T, equal to or different from each other, is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)(CH_2CH_2COOH)$—; —N=N—; —$R^aC=CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —$(CH_2)_q$— and —$(CF_2)_q$— with q=integer from 1 to 6, or an aliphatic divalent group, linear or branched, of up to 6 carbon atoms; and mixtures thereof.

More preferred recurring units ($R_{PAES}$) are those complying with following formula (B), as detailed below:

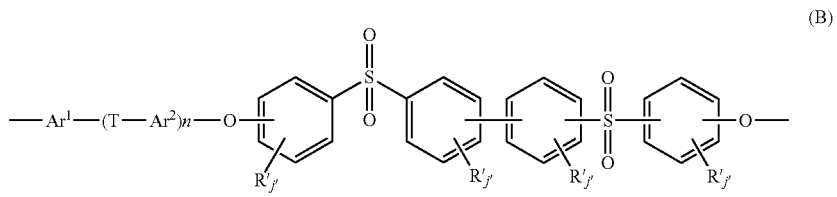

(B)

Yet another aspect of the present invention is directed to an article that includes said foam material.

DETAILED DESCRIPTION OF EMBODIMENTS

It is noted that all features described here below for recurring units ($R_{PAES}$) apply both but independently to recurring units ($R_{PAES}$-1) and ($R_{PAES}$-2).

In preferred recurring units ($R_{PAES}$), $Ar^1$, $Ar^2$ and $Ar^4$ in the formula (A), mentioned above, are equal or different from each other and are aromatic moieties preferably selected from the group consisting of those complying with following formulae:

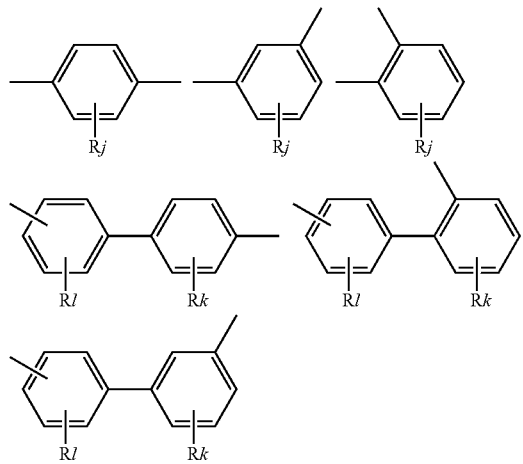

wherein each R, equal to or different form each other, is selected from the group consisting of:
hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaterwherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each of j', equal to or different from each other and at each occurrence, is independently zero or is an integer from 0 to 4;
$Ar^1$ and $Ar^2$ are equal or different from each other and at each occurrence, are independently aromatic moieties preferably selected from the group consisting of those complying with following formulae:

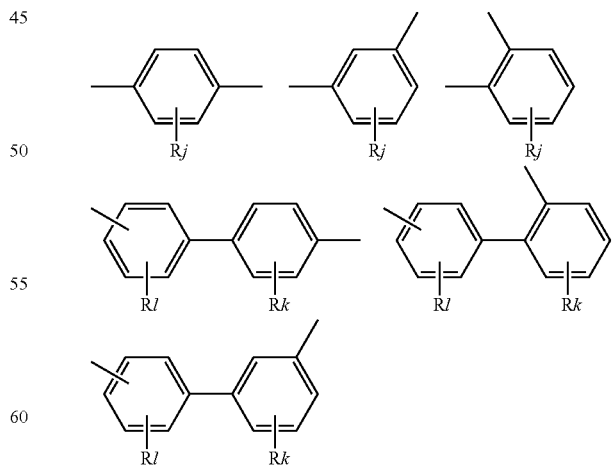

wherein
each of R is selected from the group consisting of:
hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4;

each of T, equal to or different from each other, is selected from the group consisting of a bond, —CH$_2$—, —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—;

where each R$^a$ and R$^b$; independently of one another, is a hydrogen or a C$_1$-C$_{12}$-alkyl, C$_1$-C$_{12}$-alkoxy, or C$_6$-C$_{18}$-aryl group; —(CH$_2$)$_q$— and —(CF$_2$)$_q$— with q=integer from 1 to 6, or an aliphatic divalent group, linear or branched, of up to 6 carbon atoms; and mixtures thereof; and n is 0, 1, 2, 3 or 4;

Even more preferred recurring units (R$_{PAES}$) are those selected from the group consisting of formulae (C) to (F), as below detailed, and mixtures thereof:

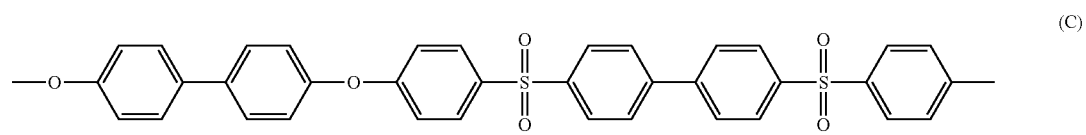

(C)

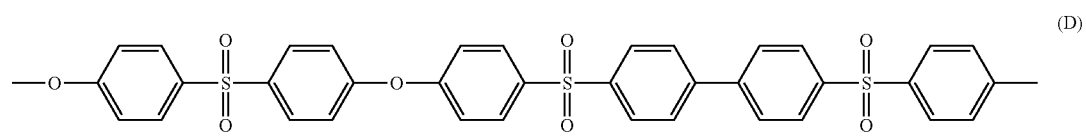

(D)

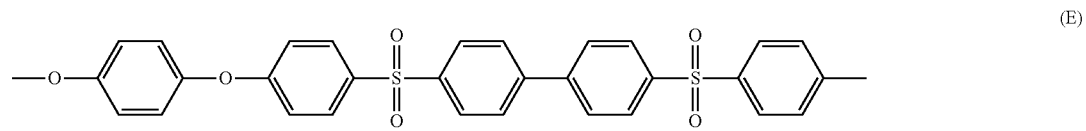

(E)

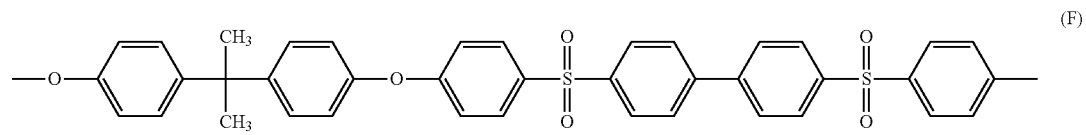

(F)

According to a preferred embodiment of the invention, the recurring units ($R_{PAES}$-1) are those complying with following formula (G), as detailed below:

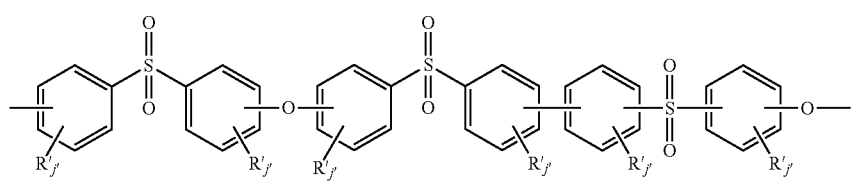

(G)

wherein
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- each of j', equal to or different from each other and at each occurrence, is independently zero or is an integer from 0 to 4.

According to a more preferred embodiment of the invention, the recurring units ($R_{PAES}$-1) are those complying with formula (D), as mentioned above.

According to a preferred embodiment of the invention, the recurring units ($R_{PAES}$-2) are those complying with following formula (H), as detailed below:

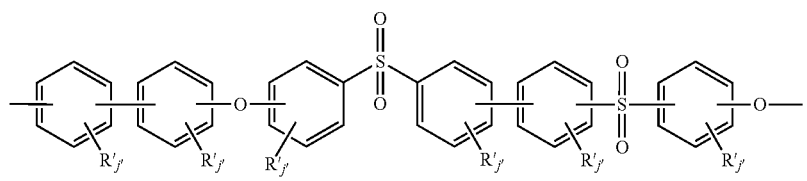

(H)

wherein
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- each of j', equal to or different from each other and at each occurrence, is independently zero or is an integer from 0 to 4.

According to a more preferred embodiment of the invention, the recurring units ($R_{PAES}$-2) are those complying with formula (C), as mentioned above.

The weight amount of the recurring units ($R_{PAES}$-1) in the ($PAES_{HT}$) polymer is generally of at least 1%, preferably at least 5%, preferably at least 15%, preferably at least 30%, more preferably at least 50%, more preferably at least 60%, even more preferably at least 75%, most preferably at least 87%, based on the total amount of recurring units ($R_{PAES}$-1) and ($R_{PAES}$-2) comprised in ($PAES_{HT}$) polymer. It is further understood that the weight amount of the recurring units ($R_{PAES}$-1) in ($PAES_{HT}$) polymer will generally be of at most 1%, preferably at most 5%, preferably at most 15%, preferably at most 30%, preferably at most 50%, more preferably at most 75%, even more preferably at most 92%, even more preferably at most 95%, most preferably at most 98% and most preferably at most 99%.

Good results were obtained when the ($PAES_{HT}$) polymer comprised the recurring units ($R_{PAES}$-1) in an amount of 50-98%, preferably of 75-95%, more preferably of 87-92%, based on the total amount of recurring units ($R_{PAES}$-1) and ($R_{PAES}$-2) comprised in ($PAES_{HT}$) polymer.

In a preferred embodiment of the present invention, the foam material made from a composition [composition (C)] comprising a ($PAES_{HT}$) polymer, wherein more than 75% weight of the recurring units of the ($PAES_{HT}$) polymer are recurring units ($R_{PAES}$-1) according to formula (G), as mentioned above and ($R_{PAES}$-2) according to formula (H), as mentioned above and the weight amount of the recurring units ($R_{PAES}$-1) in the ($PAES_{HT}$) polymer ranges from 75-95 wt. %, based on the total amount of recurring units ($R_{PAES}$-1) and ($R_{PAES}$-2).

In a more preferred embodiment of the present invention, the foam material made from a composition [composition (C)] comprising a ($PAES_{HT}$) polymer, wherein more than 75% weight of the recurring units of the ($PAES_{HT}$) polymer are recurring units ($R_{PAES}$-1) according to formula (D), as mentioned above and ($R_{PAES}$-2) according to formula (C), as mentioned above and the weight amount of the recurring units ($R_{PAES}$-1) in the ($PAES_{HT}$) polymer ranges from 75-95 wt. %, based on the total amount weight of recurring units ($R_{PAES}$-1) and ($R_{PAES}$-2).

In a particular embodiment of the present invention, the ($PAES_{HT}$) polymer may further comprise recurring units other than ($R_{PA}$). These recurring units (R1) can notably be selected from the group consisting of those of formulae (I) to (K) herein below:

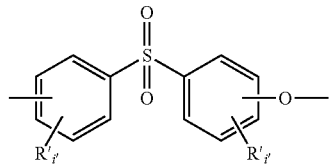

(I)

-continued

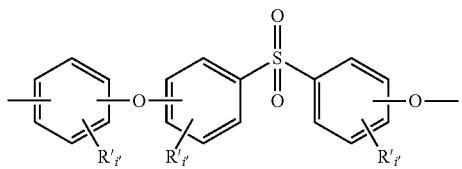
(J)

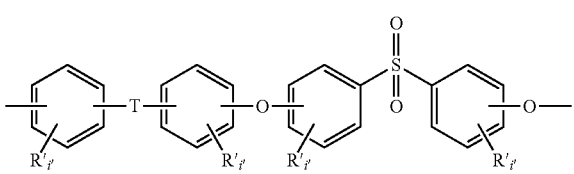
(K)

wherein
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of i', equal to or different from each other and at each occurrence, is independently zero or is an integer from 0 to 4;

each of T, equal to or different from each other, is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)$ ($CH_2CH_2COOH$)—; —N=N—; —$R^aC=CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —$(CH_2)_q$— and —$(CF_2)_q$— with q=integer from 1 to 6, or an aliphatic divalent group, linear or branched, of up to 6 carbon atoms; and mixtures thereof.

Specific recurring units (R1) can notably be selected from the group consisting of those of formulae (L) to (O) herein below:

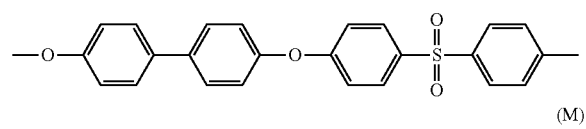
(L)

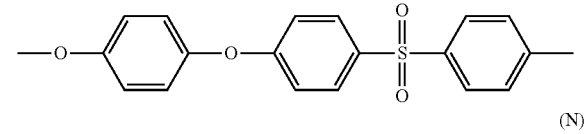
(M)

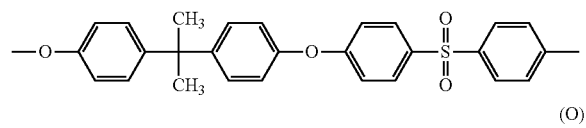
(N)

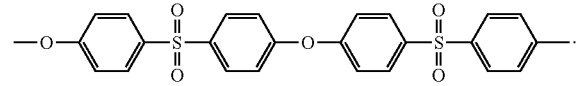
(O)

In the (PAES$_{HT}$) polymer, as detailed above, preferably more than 60% weight, more preferably more than 75% weight, still more preferably more than 90% weight, most preferably more than 95% weight, most preferably more than 99% of the total weight amount of recurring units are recurring units (R$_{PAES}$), as detailed above.

Still, it is generally preferred that substantially all recurring units of (PAES$_{HT}$) polymer are recurring units (R$_{P4}$), as above detailed; chain defects, or very minor amounts of other units might be present, being understood that these latter do not substantially modify the properties of (PAES$_{HT}$) polymer.

The (PAES$_{HT}$) polymer can be prepared by any method. Methods well known in the art are those notably described in U.S. Pat. Nos 2005/0228149 A1, 3,647,751 and 4,000,149; PCT patent applications WO 2005/095491 A1 and WO 2007/039538 A1, the whole content of which is herein incorporated by reference.

The molecular weight of the (PAES$_{HT}$) polymer, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g. The molecular weight of the (PAES$_{HT}$) polymer, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The melt flow rate (MFR) of the (PAES$_{HT}$) polymer at 400° C. and under a load of 5.0 kg, as measured in accordance with ASTM method D1238, is generally equal to of at most 80 g/10 min, preferably equal to of at most 50 g/10 min, preferably equal to of at most 40 g/10 min and more preferably equal to of at most 30 g/10 min, most preferably equal to of at most 15 g/10 min.

The melt flow rate (MFR) of the (PAES$_{HT}$) polymer at 400° C. and under a load of 5.0 kg, as measured in accordance with ASTM method D1238, is generally equal to of at least 2 g/10 min, preferably equal to of at least 4 g/10 min, preferably equal to of at least 8 g/10 min and more preferably equal to of at least 30 g/10 min.

(PAES$_{HT}$) polymers having a melt flow rate (MFR) at 400° C. and under a load of 5.0 kg, as measured in accordance with ASTM method D1238 from 2 g/10 min to 50 g/10 min are especially suitable for providing the foam material of the present invention.

(PAES$_{HT}$) polymers having a melt flow rate (MFR) at 400° C. and under a load of 5.0 kg, as measured in accordance with ASTM method D1238 from 8 g/10 min to 15 g/10 min have been found particularly suitable for providing the foam material of the present invention.

The (PAES$_{HT}$) polymer weight average molecular weight can be 20,000 to 100,000 grams per mole (g/mol) as determined by gel permeation chromatography using ASTM D5296 with polystyrene standards. In some embodiments the (PAES$_{HT}$) polymer weight average molecular weight can be 40,000 to 80,000 grams per mole (g/mol).

The (PAES$_{HT}$) polymer of the present invention has advantageously a glass transition temperature (Tg) of at least 220° C., preferably at least 225° C., more preferably at least 230° C., even more preferably at least 240° C., most preferably of at least 255° C.

The (PAES$_{HT}$) polymer may have glass transition temperatures (Tg) of 220 to 290° C.

Good results were obtained when the (PAES$_{HT}$) polymer has a glass transition temperature in the range 255 to 275° C.

The glass transition temperature (Tg) may be measured by Differential Scanning calorimetry (DSC) according to ASTM D 3418 Standard.

(PAES$_{HT}$) polymers have been found particularly suitable for the high-temperature thermoplastic compositions comprised in the high-temperature thermoplastic foam material of the present invention due to their excellent high temperature resistance, high melt viscosities which provides the high-temperature thermoplastic compositions, made there from, a robust foaming process and high chemical resistance, especially to hot liquids.

The total weight of the (PAES$_{HT}$) polymer, based on the total weight of the composition (C), is advantageously above 50 wt. %, preferably above 60 wt. %, preferably above 70 wt. %, preferably above 80 wt. %; more preferably above 90 wt. %; more preferably above 95 wt. % and more preferably above 99 wt. %.

The total weight of the (PAES$_{HT}$) polymer, based on the total weight of the composition (C), is advantageously in a range from 60 to 99.0 wt. %, preferably from 70 to 99 wt. %.

If desired, the composition (C) consists of the (PAES$_{HT}$) polymer.

The composition (C) of the present invention may further comprise at least one other thermoplastic polymer (polymer T).

For the purpose of the present invention, the other thermoplastic polymer may notably be any suitable thermoplastic polymer capable to be foamed.

Non limitative examples of polymers (T) suitable for use in composition (C) of the present invention, are for example poly(aryl ether sulfone) (PAES*) polymers different from the (PAES$_{HT}$) polymer such as polymers chosen from a group consisting of a poly(biphenyl ether sulfone), a polyethersulfone, a polyetherethersulfone or a polysulfone.

For the purpose of the present invention, a polyphenylsulfone (PPSU) is intended to denote any polymer of which more than 50 wt. % of the recurring units are recurring units (Ra*) of formula (L) herein below:

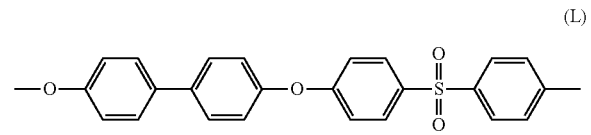

(L)

while a polyphenylsulfone homopolymer is intended to denote any polymer of which all the recurring units are recurring units (Ra) of formula (L).

The polyphenylsulfone may be notably a homopolymer, or a copolymer such as a random or a block copolymer. When the polyphenylsulfone is a copolymer, its recurring units are advantageously a mix of recurring units (Ra) of formula (L) and of recurring units (Ra*), different from recurring units (Ra), such as recurrings units of formula (M), (N) or (O) represented hereafter:

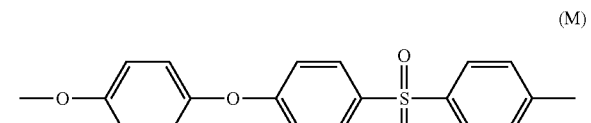

(M)

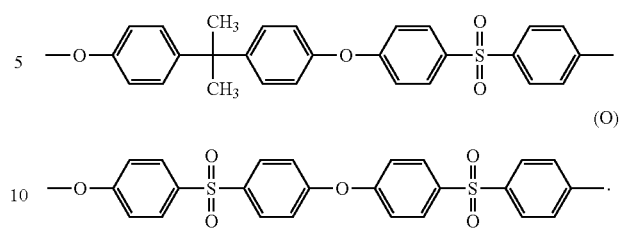

(N)

(O)

and mixtures thereof.

The polyphenylsulfone can also be a blend of the previously cited homopolymer and copolymer.

RADEL® R PPSU from Solvay Specialty Polymers USA, L.L.C. is an example of a polyphenylsulfone homopolymer.

For the purpose of the present invention, a polyethersulfone is intended to denote any polymer of which more than 50 wt. % of the recurring units are recurring units (Rb) of formula 0

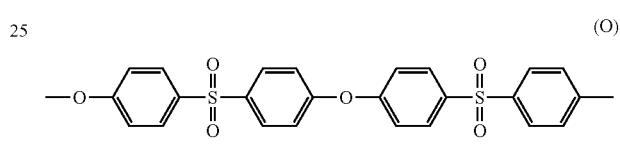

(O)

Preferably more than 75 wt. %, preferably more than 85 wt. %, preferably more than 95 wt. %, preferably more than 99 wt. % of the recurring units of the polyethersulfone are recurring units of formula (0). Most preferably all the recurring units of the polyethersulfone are recurring units of formula (0). The polyethersulfone may be notably a homopolymer, or a copolymer such as a random or a block copolymer. When the polyethersulfone is a copolymer, its recurring units are advantageously a mix of recurring units (Rb) of formula (0) and of recurring units (Rb*), different from recurring units (Rb), such as recurrings units of formula (L), (M) or (N) represented hereafter:

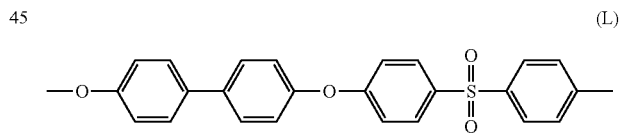

(L)

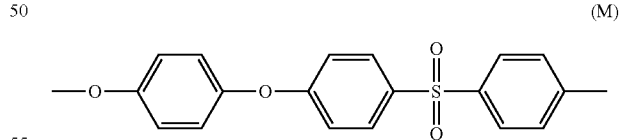

(M)

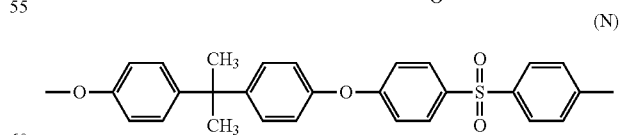

(N)

and mixtures thereof.

The polyethersulfone can also be a blend of the previously cited homopolymer and copolymer.

Polyethersulfone is notably available as Veradel® A-201 NT polyethersulfone from Solvay Specialty Polymers USA, L.L.C.

Polyethersulfones can be prepared by known methods.

For the purpose of the present invention, a polyetherethersulfone is intended to denote any polymer of which more than 50 wt. % of the recurring units are recurring units (Rc) of formula (M)

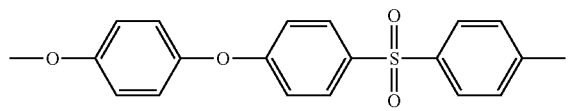
(M)

Preferably more than 75 wt. %, preferably more than 85 wt. %, preferably more than 95 wt. %, preferably more than 99 wt. % of the recurring units of the polyetherethersulfone are recurring units of formula (M). Most preferably all the recurring units of the polyetherethersulfone are recurring units of formula (M).

The polyetherethersulfone may be notably a homopolymer, or a copolymer such as a random or a block copolymer.

When the polyetherethersulfone is a copolymer, its recurring units are advantageously a mix of recurring units (Rc) of formula (M) and of recurring units (Rc*), different from recurring units (Rc), such as recurrings units of formula (L), (N) or (O) represented hereafter:

(L)

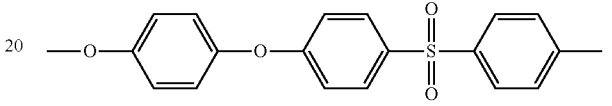
(N)

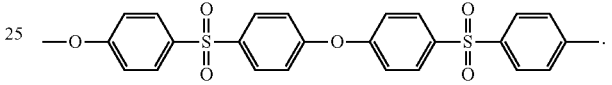
(O)

and mixtures thereof.

The polyetherethersulfone can also be a blend of the previously cited homopolymer and copolymer.

Polyetherethersulfones can be prepared by known methods.

For the purpose of the present invention, a bisphenol A polysulfone is intended to denote any polymer of which more than 50 wt. % of the recurring units are recurring units (Rd) of formula (N):

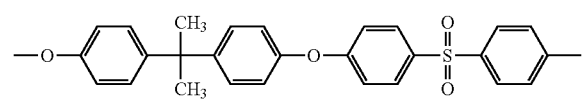
(N)

Preferably more than 75 wt. %, preferably more than 85 wt. %, preferably more than 95 wt. %, preferably more than 99 wt. % of the recurring units of the bisphenol A polysulfone are recurring units of formula (N). Most preferably all the recurring units of the bisphenol A polysulfone are recurring units of formula (N).

The bisphenol A polysulfone may be a homopolymer, or it may be a copolymer such as a random or a block copolymer. When the bisphenol A polysulfone is a copolymer, its recurring units are advantageously a mix of recurring units (Rd) and of recurring units (Rd*), different from recurring units (Rd), such as of formula (L), (M) or (O) represented hereafter:

(L)

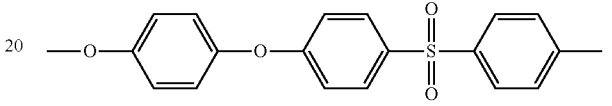
(M)

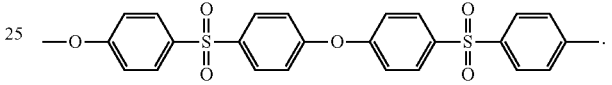
(O)

and mixtures thereof.

The Bisphenol A polysulfones can also be a blend of the previously cited homopolymer and copolymer.

The Bisphenol A polysulfones are notably available as UDEL® PSF from Solvay Specialty Polymers USA, L.L.C.

Bisphenol A polysulfones can be prepared by known methods.

In one embodiment of the present invention, the (PAES*) polymers, as described above, has advantageously a glass transition temperature (Tg) equal to or below 240° C., preferably equal to or below 230° C., more preferably equal to or below 225° C.

The weight of said other polymers (polymers T), based on the total weight of polymer composition (C), ranges advantageously from 0 to 50%, preferably from 0 to 40% and more preferably from 0 to 30%.

The composition (C) can further contain one or more ingredients other than the ($PAES_{HT}$) polymer.

The composition (C) may further contain conventional ingredients of polymeric compositions, additives such as UV absorbers; stabilizers such as light stabilizers and others; lubricants; plasticizers; pigments; dyes; colorants; anti-static agents; nucleating agents, foaming agents; blowing agents; metal deactivators; and combinations comprising one or more of the foregoing additives. Antioxidants can be compounds such as phosphites, phosphorates, hindered phenols or mixtures thereof. Surfactants may also be added to help nucleate bubbles and stabilize them during the bubble growth phase of the foaming process.

The weight of said conventional ingredients, based on the total weight of polymer composition (C), ranges advantageously from 0 to 15%, preferably from 0 to 10% and more preferably from 0 to 5%.

If desired, the composition (C) comprises more than 85 wt. % of the the ($PAES_{HT}$) polymer with the proviso that the ($PAES_{HT}$) polymer are the only polymeric components in the composition (C) and one or more optional ingredients such as additives; stabilizers; lubricants; plasticizers; pigments; dyes; colorants; anti-static agents; nucleating agents, foaming agents; blowing agents; metal deactivators; antioxidants and surfactants might be present therein, without these components dramatically affecting relevant mechanical and toughness properties of the composition (C).

The expression 'polymeric components' is to be understood according to its usual meaning, i.e. encompassing compounds characterized by repeated linked units, having typically a molecular weight of 2 000 or more.

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the ($PAES_{HT}$) polymer and all other optional thermoplastic polymers (polymers T) and ingredients, as above details, is carried out by using high intensity mixers, such as notably Henschel-type mixers and ribbon mixers.

So obtained powder mixture can comprise the ($PAES_{HT}$) polymer and optionally the polymers T in the weight ratios as above detailed, suitable for obtaining effective foaming, or can be a concentrated mixture to be used as masterbatch and diluted in further amounts of the ($PAES_{HT}$) polymer and optionally the polymers T in subsequent processing steps.

It is also possible to manufacture the composition of the invention by further melt compounding the powder mixture as above described. As said, melt compounding can be effected on the powder mixture as above detailed, or preferably directly on the ($PAES_{HT}$) polymer, optionally the polymers T and any other possible ingredient, Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

Specially designed extruders, i.e. extruders specifically designed to effectively control temperature such that further processes such as foaming is not prematurely initiated and such that the composition may be melted, blended, extruded and palletized without premature foaming of the composition, are particularly preferred. The design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients, but still mild enough to advantageously keep the processing temperature of the composition below that in which foaming may be prematurely initiated, in case optional chemical foaming ingredients are comprised in the composition. Provided that the processing temperature is kept well above the softening point of the ($PAES_{HT}$) polymer and optionally the polymers T and, when chemical foaming agent(s) are comprised, below the decomposition temperature of any of said chemical foaming components possibly present, it is advantageously possible to obtain strand extrudates of the composition (C) of the invention which have not undergone significant foaming. Such strand extrudates can be chopped by means e.g. of a rotating cutting knife aligned downwards the die plate, generally with an underwater device, which assures perfect cutting knife to die plate alignment, and collected under the form of pellets or beads. Thus, for example composition (C) which may be present in the form of pellets or beads can then be further used for the manufacture of the foam material.

The Applicant has surprisingly found that the composition (C), as mentioned above, is effective in providing foam materials having improved thermal performance capabilities, in particular more robust resistance to very high temperatures generally used in the manufacturing of structural foamed articles; having improved chemical resistance such as for example resisting hot liquids that are typically used in the transport industry, like for example jet fuels and hydraulic fluids, in particular Skydrol; improved structural integrity, high void content; low apparent density; closed cell structures and substantially uniform cell sizes.

For the purpose of the present invention, the term "substantially uniform cell size" is intended to denote a foam material wherein the magnitude of one standard deviation of the cell size frequency distribution is at most 40% of the value of the estimated mean cell size, so as an example, a foam with an estimated mean cell size of 100 micrometers and a standard deviation of 35 micrometers in cell size distribution would fall within the scope of the above definition for "substantially uniform cell size".

It has been found that the foam materials of the present invention, endowed by having uniform cell size, have improved mechanical properties since larger cells act as a weak point in the foam, which may initiate a failure.

The invention further pertains to a process for making a foam material by foaming the composition (C), as detailed above.

The foam material of the present invention may be formed using any foaming processes, which is capable of forming the foam material. Suitable foaming processes that may be used in the present invention include, but are not limited to, pressure cell processes, autoclave processes, extrusion processes, injection processes and bead foaming.

The extrusion process is most preferred.

A pressure cell process, for example, is carried out batchwise and in which the composition (C) is initially formed and is then charged with a gas under a pressure that is higher than atmospheric pressure and at a temperature that is below the glass transition temperature of the polymer/gas mixture. The temperature is then raised to a temperature that is above the glass transition temperature but below the critical temperature of the polymer/gas mixture, by immersing in a heating bath, and then the gas is driven out of the formed body to produce the desired foam structure. Transfer from the pressure cell to the heating bath must be carried out as fast as possible, considering that the dissolved gas can quickly diffuse out of the polymer at ambient pressure. After foaming, the polymeric formed body must be quenched in an ethanol/water mixture at about 20° C.

In an autoclave process, for example, the composition (C) is charged with a gas at a temperature that is above the glass transition temperature of the polymer/gas mixture and foaming is induced by spontaneous release of the pressure. In contrast to the pressure cell process, in which the gas-charged polymer is normally transferred to a heating bath to raise the temperature to above the glass transition temperature but below the critical temperature of the polymer/gas mixture, the autoclave process does not need a heating stage as the polymer is already at the required temperature that is above the glass transition temperature on charging with the gas.

An extrusion process, in contrast to the two processes described above, is a continuous process. In general, in the extrusion process, the foam is formed by melting a thermoplastic, or a mixture comprising a thermoplastic (e.g. the composition (C) and a nucleating agent in the form of a pellet or a bead), giving a melt, whereby said melt is mixed with at least one blowing agent under pressure. At the exit of the extruder, during depressurization, the blowing agent vaporizes and, by absorbing heat of evaporation, rapidly cools the melt thereby forming the foam.

Any suitable extrusion equipment capable of processing composition (C) can be used for the extrusion. For example, single or multiple-screw extruders can be used, with a tandem extruder being preferred.

In a specific preferred embodiment, a mixture comprising the composition (C) and any nucleating agent are first melt blended together in a primary extruder. The blowing agent is then fed into the primary extruder and mixed into the melt blend under high pressure and temperature in the last sections of the primary extruder. The melt is then fed under pressure to a secondary extruder, which is used to cool the material to be foamed and transport it through a die to a calibrator to form the foam material. The calibrator helps to control the cooling rate of the foaming mixture. Therefore, it is beneficial in helping to control the thickness, width and density of the foam material. The die is operated at a specific temperature range and pressure range to provide the necessary melt strength and to suppress premature foaming in the die. In one embodiment, a single screw extruder is used for both the primary extruder and the secondary extruder. In an alternative embodiment, a twin-screw extruder is used for both the primary extruder and the secondary extruder. In yet another alternative embodiment, a single screw extruder is used for one of the primary extruder or the secondary extruder and a twin-screw extruder is used for the other.

In the process of the invention, a blowing agent, or blends of blowing agents, can advantageously be used in different amounts depending on the desired density of the foam. In one preferred embodiment of the present invention, the amount used of the blowing agent is from 0.5 to 15 percent by weight, preferably from 1 to 12 percent by weight, particularly preferably from 3 to 10 percent by weight, based in each case on the total weight of the composition (C).

In general, a larger amount of blowing agent may be used for embodiments where lower density foams are to be formed.

In general, the blowing agent is selected to be sufficiently soluble to grow the voids into the bubbles that form a foam material having the selected density. As a result, if all of the parameters including solubility of the blowing agent with the $(PAES_{HT})$ polymer and optionally the polymers T melt (at pressure, temperature and shear rate) are balanced and the walls of the bubbles are sufficiently stable such that they do not rupture or coalesce until the viscosity/melt strength of the resin/blowing agent is strong enough to form a stable foam as it cools, the result is a good, uniform, small celled foam having a selected density.

In general, the type of foam to be produced may also vary depending on other factors such as the presence of nucleating agent particles, the loading and/or process conditions, and the type of equipment used to form the foam materials.

In the process of the invention, a nucleating agent, or blends of nucleating agents, can advantageously be used and is/are preferably used in addition to the blowing agent, or blends of blowing agents. In general, the nucleating agent helps control the foam structure by providing a site for bubble formation, and the greater the number of sites, the greater the number of bubbles and the less dense the final product can be, depending on processing conditions. As such, for lower density foams, a larger amount of nucleating agent may be used while no or small amounts of nucleating agent may be used for embodiments where higher density foams or larger bubbles are to be formed.

Suitable nucleating agent that may be used in the present invention include, but are not limited to, metallic oxides such as titanium dioxide, clays, talc, silicates, silica, aluminates, barites, titanates, borates, nitrides, notably boron nitride, and even some finely divided, unreactive metals, carbon-based materials (such as diamonds, carbon black, nanotubes and graphenes) or combinations including at least one of the foregoing agents. In alternative embodiments, silicon and any crosslinked organic material that is rigid and insoluble at the processing temperature may also function as nucleating agents.

In alternative embodiments, other fillers may be used provided they have the same effect as a nucleating agent in terms of providing a site for bubble formation. This includes fibrous fillers such as aramid fibers, carbon fibers, glass fibers, mineral fibers, or combinations including at least one of the foregoing fibers. Some nano-fillers and nano-reinforcements can also be used as nucleating agents. These include such materials as nano-silicates, nano-clays, carbon nanofibers and carbon nanotubes as well as graphenes and multi-layered graphitic nano-platelets.

In a preferred embodiment, the nucleating agent is preferably used in the following amounts: advantageously from 0.1 to 5% by weight, preferably from 0.2 to 3% by weight based in each case on the total weight of the composition (C).

Having regards to the nature of the blowing agent, the foaming process may be a chemical or a physical foaming process.

In one preferred embodiment, the foaming process is a physical foaming process.

In a physically foaming process, use is made of physical foaming ingredients, such as physical blowing agents and optionally nucleating agents.

Physical foaming agents generally refer to those compounds that are in the gaseous state in the foaming conditions (generally high temperature and pressure) because of their physical properties.

The physical foaming agents can be fed to the equipment, wherein foaming takes place, either in their gaseous form, or in any other form, from which a gas will be generated via a physical process (e.g. evaporation, desorption). Otherwise, physical foaming may be included in the pre-formed composition (C), to be introduced in the foaming equipment.

In the process of the present invention, any conventional physical blowing agent can be used such as inert gases, e.g. $CO_2$, nitrogen, argon; hydrocarbons, such as propane, butane, pentane, hexane; aliphatic alcohols, such as methanol, ethanol, propanol, isopropanol, butanol; aliphatic ketones, such as acetone, methyl ethyl ketone; aliphatic esters, such as methyl and ethyl acetate; fluorinated hydrocarbons, such as 1,1,1,2-tetrafluoroethane (HFC 134a) and difluoroethane (HFC 152a); and mixtures thereof. Preferably, isopropanol or ethanol are used as physical blowing agent.

It is understood that as the physical blowing agent is supplied in fluid form to a melt, it advantageously generates bubbles. This may also be realized in extrusion devices.

In an alternative embodiment of the present invention, the foaming process is a chemical foaming process.

In a chemical foaming process, use is generally made of a chemical foaming agent, in particular a chemical blowing agent.

Chemical foaming agents generally refer to those compositions which decompose or react under the influence of heat in foaming conditions, to generate a foaming gas.

Chemical foaming agents can be added to a melt thereby generating in situ the foaming gas or alternatively the generated foaming gas can be added to the melt. This may also be realized in extrusion devices.

Suitable chemical foaming agents include notably simple salts such as ammonium or sodium bicarbonate, nitrogen evolving foaming agents; notably aromatic, aliphatic-aromatic and aliphatic azo and diazo compounds, such as azodicarbonamide and sulphonhydrazides, such as benzene sulphonhydrazide and oxy-bis(benzenesulphonhydrazide). Said chemical foaming agents can optionally be mixed with suitable activators, such as for example amines and amides, urea, sulphonhydrazides (which may also act as secondary foaming agent); and the like.

While the finished foam material is substantially free of the blowing agents, it is contemplated that residual amounts of the one or more blowing agents may remain in the foam material, although these residual amounts are not sufficient to adversely affect the foam characteristics of the foam material.

In alternative embodiments, any of the residual blowing agent may be reduced by exposing the foam material further to a heat cycle.

The foam material of the present invention has advantageously a density in the range from 10 to 500 kg/m³, preferably from 20 to 400 kg/m³, more preferably from 30 to 300 kg/m³, even more preferably from 25 to 250 kg/m³.

The foam material of the present invention has advantageously an average cell size of less than 1000 µm, preferably less than 500 µm, and more preferably less than 250 µm The density can be measured according to ASTM D1622.

The cell size can be measured using optical or scanning electron microscopy.

The foam materials, as formed according to the present invention may be in a variety of shapes, such as foam boards, foam sheets, foam film, foam tubes or any shape possible as determined by the skilled in the art using standard techniques and routine work, temperature, power and residence time of the composition in the extruder so as to obtain final desired shaped foamed parts having the desired void fraction or foaming level.

An aspect of the present invention also provides an article comprising at least one component comprising the foam material, detailed as above, which provides various advantages over prior art parts and articles, in particular higher stiffness and improved strength properties relative to state of the art foams at a given density at elevated temperatures, particularly at temperatures between 150° C. and 230° C.; the increased strength and stiffness at elevated temperature will result in improved structural integrity of the foam overall especially when high temperature fabrication steps such as for example thermosetting resin transfer molding, are applied.

Preferably, the article or part of the article consists of the foam material as above detailed.

In a particular embodiment, the article is an aircraft structural component a structural or secondary aircraft component.

In another specific embodiment, the aircraft structural component is a sandwich panel comprised of a core comprising the foam material of the present invention and laminated skin layers comprised of a continuous fiber-reinforced thermoset or thermoplastic composite.

Said sandwich panels can be prepared by known methods, such as for example by vacuum infusion which involves notably infusing a system comprised of a foam with a skin comprising of carbon fibers or other fibers as mentioned above with an epoxy resin by means of an applied vacuum.

The impregnation is generally performed at low temperatures which are usually in the range from 80° C. to 130° C. and the curing is generally between 120° C. and 200° C.

The use of the foam materials of the present invention as part of an aircraft structural component as described above are also objects of the present invention.

It is known in the art that epoxy resin systems such as Hexflow VRM34, (a two-part, amine-cured epoxy system) are used in vacuum assisted resin transfer molding (VARTM) processes, used in the manufacturing of aircraft structural components such as wing and fuselage structural elements.

Should the disclosure of any patents, patent applications, and publications which are incorporated herein by reference conflict with the description of the present application to the extent that it may render a term unclear, the present description shall take precedence.

EXAMPLES

The invention will be now described in more details with reference to the following examples, whose purpose is merely illustrative and not intended to limit the scope of the invention.

Raw Materials

Titanium Dioxide:—Tipure® R-105 titanium dioxide, a rutile $TiO_2$ manufactured by the chloride process, treated with silica and alumina.

Talc: IMI Fabi HTP-4 talc, available from IMI Fabi LLC

EpiSpire® EP-340P high temperature sulfone polymer commercially available from Solvay Specialty Polymers USA, LLC, having melt flow rate according to ASTM D1238 in the range 8 to 15 g/10 min as measured at 400° C. and 5.0 kg weight. A ($PAES_{HT}$) polymer comprising recurring units ($R_{PAES}$-1) complying with formula (D) and recurring units ($R_{PAES}$-2) complying with formula (C).

EpiSpire® EP-340NT high temperature sulfone polymer commercially available from Solvay Specialty Polymers USA, LLC, having melt flow rate according to ASTM D1238 in the range 8 to 15 g/10 min. as measured at 400° C. and 5.0 kg weight. A ($PAES_{HT}$) polymer comprising recurring units ($R_{PAES}$-1) complying with formula (D) and recurring units ($R_{PAES}$-2) complying with formula (C).

Polyethersulfone: Veradel® A-201 NT polyethersulfone commercially available from Solvay Specialty Polymers USA, LLC, having melt flow rate according to ASTM D1238 in the range 15 to 25 g/10 min. as measured at 380° C. and 2.16 kg weight.

General Procedure for the Preparation of Material for Foaming

A polymer or polymer mixture is compounded with 2 parts of $TiO_2$ per hundred parts of resin. Compounding into pellets is performed on a Berstorff 25 mm twin screw extruder having an L/D ratio of 40:1 and eight barrel sections, of which sections 2-8 are equipped with heating and cooling. In each case, the base polymer pellets and the $TiO_2$ are first tumble-blended for twenty minutes and then the mix is fed to the throat of the extruder. The extruder is set at a barrel temperature of 330° for barrel sections 2-8. The die temperature is set at 340° C. and a screw speed of 200 rpm is used along with a throughput rate of 25 lb/hr for each of the four formulations. Vacuum venting of the melt is performed at barrel section 7. The extrudate from the extruder in each case is cooled in a water trough and then pelletized. The pellets produced from the formulation are dried at temperatures between 130 and 180° C. for 8 hours and are next fed to the foaming set up which consists of a 41 mm diameter Reifenhauser twin screw extruder set in series with a 50 mm Reifenhauser single screw extruder. The first extruder (A extruder) output is fed via a melt pipe directly into the second (B extruder) in a parallel configuration. The A extruder has an L/D ratio of 43 while the B extruder has an L/D of 30. The B extruder is equipped with a 1 mm slit die. The pellets produced from the formulation is fed to the A extruder where it melts. The injection point for the blowing agent is located at two thirds of the way down the axial length of the A extruder. Isopropanol was metered and about 7% by weight is injected into the polymer melt at pressures of 60-150 bar depending on the present melt pressure in the extruder. The homogenized polymer melt and isopropanol mixture is then fed into the B extruder where the mixture is cooled down to temperatures between 220 and 280°. The mixture is then extruded through the slit die and into a calibrator to form a foamed sheet.

Example 1

A foamed sheet is produced from the EpiSpire® EP-340P high temperature sulfone polymer according to the general procedure, as described above.

The resulting foam has an apparent density of 60-120/kg/m$^3$, and from Scanning electron microscopy (SEM), a highly uniform cell morphology is observed.

Example 2

A foamed sheet is produced from the polymer mixture EpiSpire® EP-340P high temperature sulfone polymer/Veradel® A-201 NT polyethersulfone in a 80/20 ratio according to the general procedure, as described above.

The resulting foam has an apparent density of 60-120/kg/m$^3$, and from Scanning electron microscopy (SEM), a highly uniform cell morphology is observed.

Example 3

A foamed sheet was produced from the EpiSpire® EP-340NT high temperature sulfone polymer according to the general procedure, as described above, except that 1% by weight of HTP-4 talc was used as nucleating agent instead of TiO$_2$ and ethanol was used as blowing agent instead of isopropanol and its concentration was set at 6.54 wt. %. The so obtained foam sheet was measured for its density and was found to have a density of 93.3 kg/m$^3$. The corresponding properties are shown in Table 1.

From Scanning electron microscopy (SEM), a highly uniform cell morphology was observed.

Example 4

A foamed sheet was produced from the polymer mixture EpiSpire® EP-340NT high temperature sulfone polymer/Veradel® A-201 NT polyethersulfone in a 80/20 ratio according to the general procedure, as described above, except that 1% by weight of HTP-4 talc was used as nucleating agent instead of TiO$_2$ and ethanol was used as blowing agent instead of isopropanol and its concentration was set at 6.10 wt. %. The so obtained foam sheet was measured for its density and was found to have a density of 65.9 kg/m$^3$. The corresponding properties are shown in Table 1.

From Scanning electron microscopy (SEM), a highly uniform cell morphology was observed.

Example 5

A foamed sheet was produced from the polymer mixture EpiSpire® EP-340NT high temperature sulfone polymer/Veradel® A-201 NT polyethersulfone in a 50/50 ratio according to the general procedure, as described above, except that 1 wt. % of HTP-4 talc was used as nucleating agent instead of TiO$_2$ and ethanol was used as blowing agent instead of isopropanol and its concentration was set at 6.10 wt. %. The so obtained foam sheet was measured for its density and was found to have a density of 47.4 kg/m$^3$. The corresponding properties are shown in Table 1.

From Scanning electron microscopy (SEM), a highly uniform cell morphology was observed.

Comparative Example 6

A foamed sheet was produced from the polymer mixture EpiSpire® EP-340NT high temperature sulfone polymer/Veradel® A-201 NT polyethersulfone in a 20/80 ratio according to the general procedure, as described above, except that 1 wt. % of HTP-4 talc was used as nucleating agent instead of TiO$_2$ and ethanol was used as blowing agent instead of isopropanol and its concentration was set at 5.70 wt. %. The so obtained foam sheet was measured for its density and was found to have a density of 40.9 kg/m$^3$. The corresponding properties are shown in Table 1.

From Scanning electron microscopy (SEM), a highly uniform cell morphology was observed.

Comparative Example 7

A foamed sheet was produced from Veradel® A-201 NT polyethersulfone according to the general procedure, as described above, except that 1 wt. % of HTP-4 talc was used as nucleating agent instead of TiO$_2$ and ethanol was used as blowing agent instead of isopropanol and its concentration was set at 5.70 wt. %. The so obtained foam sheet was measured for its density and was found to have a density of 42.4 kg/m$^3$. The corresponding properties are shown in Table 1.

The following characterizations carried out on the materials of the Examples are indicated hereinafter:
Glass Transition Temperature (Tg) Measurements The glass transition temperature (Tg) of the foams obtained from the polymer or polymer mixture, as described above, was measured by Differential Scanning calorimetry (DSC) according to ASTM D 3418 Standard.
Density Measurements Density was measured using ASTM method D1622 where the density was measured as the ratio of the weight to volume of foam blocks having precise dimensions.
Cell Size Measurements Cell size and cell size distribution in the foams obtained were characterized by scanning electron microscopy (SEM). Image analysis of the SEM images of foam cross sections was performed using the "ImageJ" image analysis software Version 1.44 which is publically available on the Internet.
Mechanical Properties The mechanical properties of the foams obtained were tested for Compressive Strength according to ASTM D1621 standard method. The foam panels produced were first sanded on the top and bottom surfaces to remove the irregular skin on either side of the foam material and to level and smooth out the top and bottom surfaces of the panel. 2 inch×2 inch square sections were then machined using a precision band saw to produce specimens of well defined dimensions for compression testing. Prior to compression testing the compression test specimens were heat treated in a forced air convection oven at a temperature of 225° F. (107° C.) for 24 hours to assure removal of any residual blowing agent from the foam specimens.

It is known that the Compressive Strength of a foam material are strongly dependent on its foam density. Therefore, all Compressive Strength data measured for the foam materials, were normalized to Compressive Strength values at a density of 60 kg/m³, by using the following equations $S_{60}=S(60/\rho)^{1.5}$, where $S_{60}$ is the compressive strength normalized to a density of 60 kg/m³; S and ρ are the compressive strength and density of the sample, respectively.

TABLE 1

| Examples No | 3 | 4 | 5 | C6 | C7 |
|---|---|---|---|---|---|
| EpiSpire ® EP-340NT high temperature sulfone polymer ($PAES_{HT}$) polymer (wt. % relative to total weight of ($PAES_{HT}$) polymer and (PES)) | 100 | 80 | 50 | 20 | 100 |
| Veradel ® A-201 NT polyethersulfone (PES) (wt. % relative to total weight of ($PAES_{HT}$) polymer and (PES)) | 0 | 20 | 50 | 80 | 0 |
| HTP-4 talc (wt. % relative to total weight of composition (C)) | 1 | 1 | 1 | 1 | 1 |
| Foam material properties at 23° C. | | | | | |
| Tg (° C.) | 263.9 | 254.2 | 242.5 | 231.4 | 225.6 |
| Density (kg/m³) | 95.7 | 63.7 | 48.1 | 39.7 | 42.04 |
| Average Cell Size (μm) flow direction | 41.2 | 118.2 | 131.0 | 443.6 | 1013.5 |
| Average Cell Size (μm) transverse direction | 43.4 | 91.2 | 118.2 | 410.7 | 968.9 |
| Mechanical properties at 23° C. | | | | | |
| Compressive Strength (MPa) | 1.63 | 0.93 | 0.46 | 0.31 | 0.25 |
| Normalized Comp. Str. at 60 kg/m³ Density (MPa)[a] | 0.81 | 0.85 | 0.64 | 0.57 | 0.42 |
| Mechanical properties at 200° C. | | | | | |
| Compressive Strength (MPa) | 1.15 | 0.68 | 0.29 | 0.23 | 0.16 |
| Normalized Comp. Str. at 60 kg/m³ Density (MPa)[a] | 0.61 | 0.58 | 0.42 | 0.41 | 0.26 |

[a]Compressive Strength normalized to Compressive Strength at a density of 60 kg/m³ using equation $S_{60} = S(60/\rho)^{1.5}$ where $S_{60}$ is the compressive strength normalized to a density of 60 kg/m³ and S and ρ are the compressive strength and density of the foam material.

The invention claimed is:

1. A foam material made from a composition (C) comprising at least one other thermoplastic polymer, (polymer T), selected from the group consisting of a poly(biphenyl ether sulfone), a polyethersulfone, a polyetherethersulfone, or a polysulfone, and at least one high temperature poly(aryl ether sulfone) polymer, ($PAES_{HT}$) polymer, wherein the ($PAES_{HT}$) polymer comprises recurring units ($R_{PAES}$), wherein the recurring units ($R_{PAES}$) comprise:

(i) from 1 to 99% by weight amount of at least one recurring unit ($R_{PAES}$-1), based on the total amount of the recurring units ($R_{PAES}$), and (ii) from 1 to 99% by weight amount of at least one recurring unit ($R_{PAES}$-2), based on the total amount of the recurring units ($R_{PAES}$), wherein the recurring unit ($R_{PAES}$-2) is different from the recurring unit ($R_{PAES}$-1), and the recurring units ($R_{PAES}$) are of formula (A):

$$—Ar^1\text{-}(T\text{-}Ar^2)_n—O—Ar^3—SO_2—[Ar^4\text{-}(T\text{-}Ar^2)_n—SO_2]_m—Ar^5—O—\quad \text{(formula A)}$$

wherein:
$Ar^1$, $Ar^2$ and $Ar^4$ equal to or different from each other and at each occurrence, are independently an aromatic mono- or polynuclear group;
$Ar^3$ and $Ar^5$ equal to or different from each other and at each occurrence, are independently aromatic moieties selected from the group consisting of formulae:

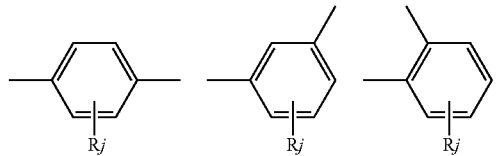

wherein:
each R, equal to or different form each other, is selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and
each j, equal to or different from each other, are independently 0, 1, 2, 3, or 4;

each T, equal to or different from each other, is a bond or a divalent group optionally comprising one or more than one heteroatom;
n is 0, 1, 2, 3, or 4; and
m is 1, 2, 3, or 4.

2. The foam material according to claim 1, wherein the recurring unit ($R_{PAES}$-1) is of formula (G):

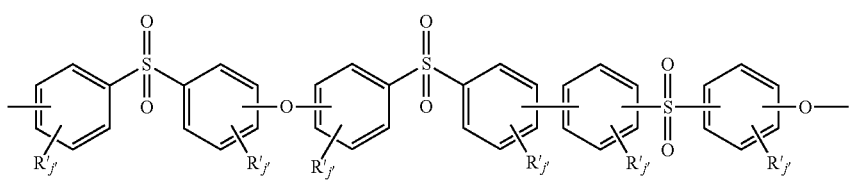

(G)

wherein:
  each R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;
  each j', equal to or different from each other and at each occurrence, is independently zero or is an integer from 0 to 4.

3. The foam material according to claim 1, wherein the recurring unit ($R_{PAES}$-2) is of formula (H):

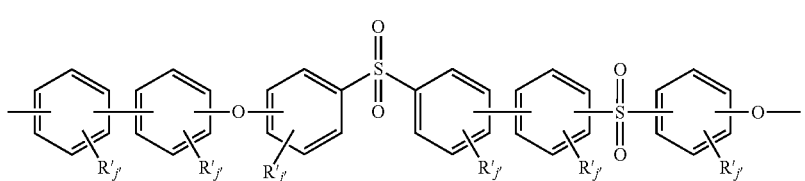

(H)

wherein:
  each R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;
  each j', equal to or different from each other and at each occurrence, is independently zero or is an integer from 0 to 4.

4. The foam material according to claim 1 comprising 50-98% by weight of the recurring unit ($R_{PAES}$-1), based on the total amount of the recurring unit ($R_{PAES}$-1) and the recurring unit ($R_{PAES}$-2) in the ($PAES_{HT}$) polymer.

5. The foam material according to claim 1, wherein the foam material has a density of 10 to 500 kg/m³.

6. The foam material according to claim 1, wherein the foam material has a substantially uniform cell size.

7. A process for manufacturing the foam material according to claim 1, the process comprising a foaming process, wherein the foaming process is selected from the group consisting of pressure cell processes, autoclave processes, and extrusion processes.

8. The process according to claim 7, wherein a blowing agent is used in an amount from 0.5 to 15% by weight, based on the total weight of the composition (C).

9. The process according to claim 7, wherein a nucleating agent is used in an amount from 0.1 to 5.0% by weight, based on the total weight of the composition (C).

10. The process according to claim 7, wherein the foaming process is a physical foaming process.

11. The process according to claim 10, wherein the physical foaming process is an extrusion process.

12. An article comprising at least one component, the component comprising the foam material according to claim 1.

13. The article of claim 12, wherein the article is a structural aircraft component or secondary aircraft component.

14. The article of claim 13, wherein the structural aircraft component is a sandwich panel comprising:

(i) a core, the core comprising a foam material made from a composition (C) comprising at least one other thermoplastic polymer, (polymer T), selected from the group consisting of a poly(biphenyl ether sulfone), a polyethersulfone, a polyetherethersulfone, or a polysulfone, and at least one high temperature poly(aryl ether sulfone) polymer, ($PAES_{HT}$) polymer, wherein the ($PAES_{HT}$) polymer comprises recurring units ($R_{PAES}$), wherein the recurring units ($R_{PAES}$) comprise:
(i) from 1 to 99% by weight amount of at least one recurring unit ($R_{PAES}$-1), based on the total amount of the recurring units ($R_{PAES}$), and
(ii) from 1 to 99% by weight amount of at least one recurring unit ($R_{PAES}$-2), based on the total amount of the recurring units ($R_{PAES}$), wherein the recurring unit ($R_{PAES}$-2) is different from the recurring unit ($R_{PAES}$-1), and
the recurring units ($R_{PAES}$) are of formula (A):

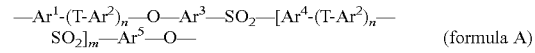

(formula A)

wherein:
  $Ar^1$, $Ar^e$ and $Ar^4$ equal to or different from each other and at each occurrence, are independently an aromatic mono- or polynuclear group;

Ar³ and Ar^v equal to or different from each other and at each occurrence, are independently aromatic moieties selected from the group consisting of formulae:

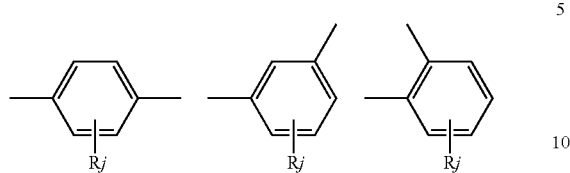

wherein:
  each R, equal to or different form each other, is selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and
each j, equal to or different from each other, are independently 0, 1, 2, 3, or 4;
  each T, equal to or different from each other, is a bond or a divalent group optionally comprising one or more than one heteroatom;
  n is 0, 1, 2, 3, or 4; and
  m is 1, 2, 3, or 4; and
(ii) laminated skin layers comprised of a continuous fiber-reinforced thermoset or thermoplastic composite.

* * * * *